May 27, 1924.
E. CHESHIRE
COMPOSING ROOM SAW
Filed Jan. 27, 1922
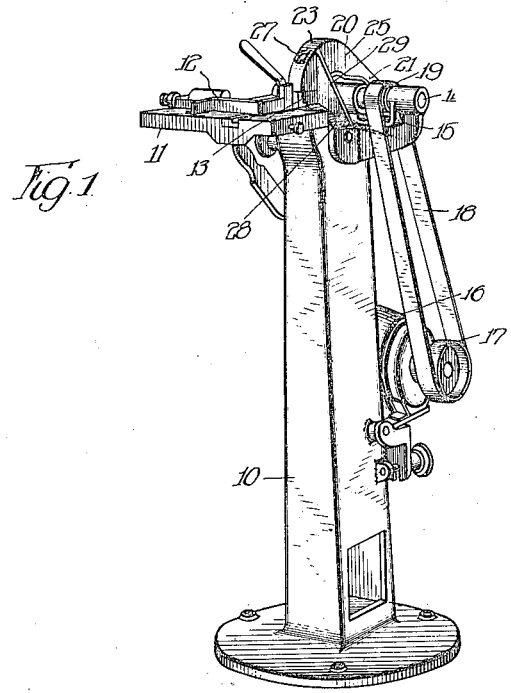
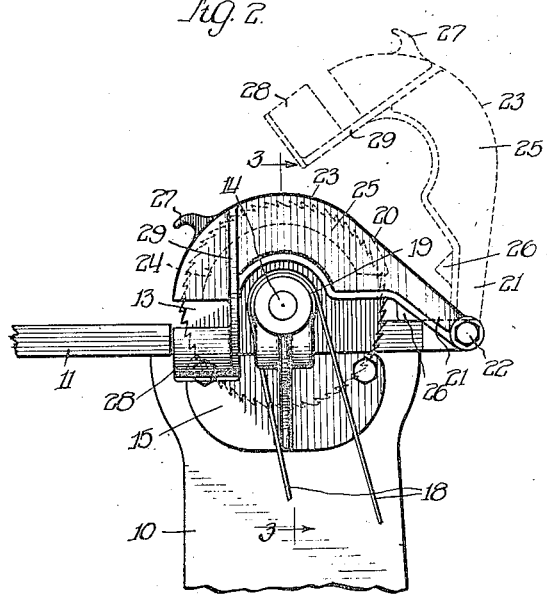
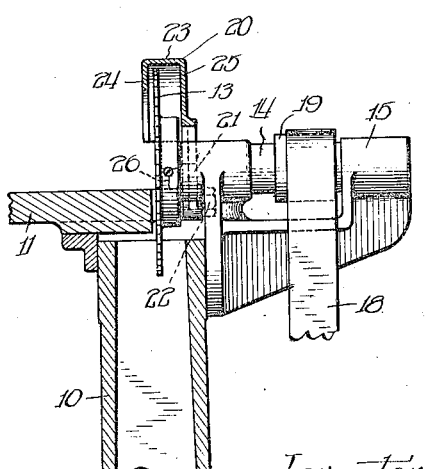
Witness:
R. Burkhardt.
Inventor:
Edward Cheshire,
By Wilkinson, Huxley, Byron & Knight
Attys.

Patented May 27, 1924.

1,495,248

UNITED STATES PATENT OFFICE.

EDWARD CHESHIRE, OF BERLIN TOWNSHIP, WAUKESHA COUNTY, WISCONSIN.

COMPOSING-ROOM SAW.

Application filed January 27, 1922. Serial No. 532,208.

*To all whom it may concern:*

Be it known that I, EDWARD CHESHIRE, a citizen of the United States, residing at Berlin Township, in the county of Waukesha and State of Wisconsin, have invented certain new and useful Improvements in a Composing-Room Saw, of which the following is a specification.

This invention relates to a composing room saw and more particularly to a saw guard and its arrangement on a composing room saw.

One object of the invention is to provide a simple and practical saw guard having guide means normally in operative association with the saw for directing and carrying away waste material from the saw.

Another object is to provide a simple saw guard having its parts so arranged as to safeguard against injury.

These and other objects are accomplished by means of the arrangement disclosed on the accompanying sheet of drawings, in which—

Figure 1 is a perspective view of a composing room saw embodying my invention;

Figure 2 is a fragmentary side elevation of the same saw showing the saw guard in operative position in full lines and inoperative position in dotted lines; and Figure 3 is a fragmentary sectional view taken in the plane of line 3—3 of Figure 2.

The various novel features of the invention will be apparent from the following description and drawings, and will be particularly pointed out in the appended claims.

Referring to the figures of the drawings, it will be noted that my invention is disclosed in connection with a composing room saw including a pedestal 10 at the upper end of which a table 11 is mounted, said table being equipped with suitable means 12 for properly aligning and positioning material to be cut by a saw 13 which is mounted upon one end of a shaft 14 carried by a bracket 15 which may be secured to or form a part of the pedestal 10. The saw may be driven from any suitable source. In this particular instance the saw is driven by an electric motor 16 having a pulley 17 around which a belt 18 passes, said belt also passing around a pulley 19 on the shaft 14.

For protection against injury, means is provided for enclosing the saw. Such means in this instance takes the form of a saw guard 20 the rear end of which terminates in an arm 21 which is pivotally connected at 22 to the table 11 or other suitable support. The guard includes a semi-circular housing portion 23 which surrounds the upper half of the saw and has side wall flanges 24 and 25 which extend well down over the cutting edge of the saw, making it practically impossible for any one to place his fingers in a position under the saw guard in a manner to be cut. The arm 21 of the saw guard is provided with a stop portion 26 which is adapted to engage the table 11 for limiting the saw guard in its downward movement into protecting position. The front end of the saw guard is provided with a projection 27 by means of which the guard may be raised and lowered.

This saw guard is provided with means for directing and carrying away waste material from the saw. This means takes the form of a chute or guide 28 which extends laterally and downwardly from the saw guard and from a point adjacent the side of of the saw so that when the saw guard is in its normal operative and protecting position, the waste material chute or guide 28 is arranged adjacent the saw and in a position to catch, direct and carry away the waste material resulting from the sawing action. Preferably this guide chute is integrally formed with the saw guard and is connected thereto by a vertically extending laterally arranged web 29 which is triangular in shape and extends from one side 25 of the saw guard down to the downwardly and laterally extending guide chute 28. One reason for preferably forming or securing the guide chute to the saw guard is that the operator of necessity keeps the guard down in protecting position in order that the waste material can be properly carried away and at the same time prevent fingers from being injured.

It is my intention to cover all modifications of the invention falling within the spirit and scope of the following claims.

I claim:

1. In a composing room saw, the combination of a support, a saw in operative association therewith, and a saw guard supported by said support and having guide means for directing and carrying waste material laterally away from the side of the saw.

2. In a composing room saw, the combination of a support, a saw in operative association therewith, and a saw guard pivotally connected to said support and having integrally formed therewith guide means for directing and carrying waste material from the saw.

3. In a composing room saw, the combination of a support, a saw in operative association therewith, and a saw guard movable into and out of operative association with respect to said saw, said guard having means, when the saw guard is in operative position, for directing and carrying waste material from the saw.

4. A movably mounted saw guard for a composing room saw comprising a housing, and a chute extending downwardly therefrom for directing and carrying away waste material from the saw.

5. A saw guard for a composing room saw comprising a housing and a chute integrally formed with said housing extending downwardly and laterally from the side of said housing.

6. A saw guard for a composing room saw comprising a housing and a chute integrally formed with said housing extending downwardly and laterally from said housing, said housing and chute being connected by a vertically extending web.

7. A saw guard for a composing room saw including a housing having flanges for covering both sides of the saw and a chute integrally formed with one of said side flanges whereby waste material from the saw may be directed and carried away therefrom.

Signed at St. Petersburg, Florida, this 19th day of January, 1922.

EDWARD CHESHIRE.